Jan. 17, 1956 A. GOLDHAMMER 2,730,938
STEREOSCOPIC CAMERA
Filed Feb. 18, 1953 2 Sheets-Sheet 1
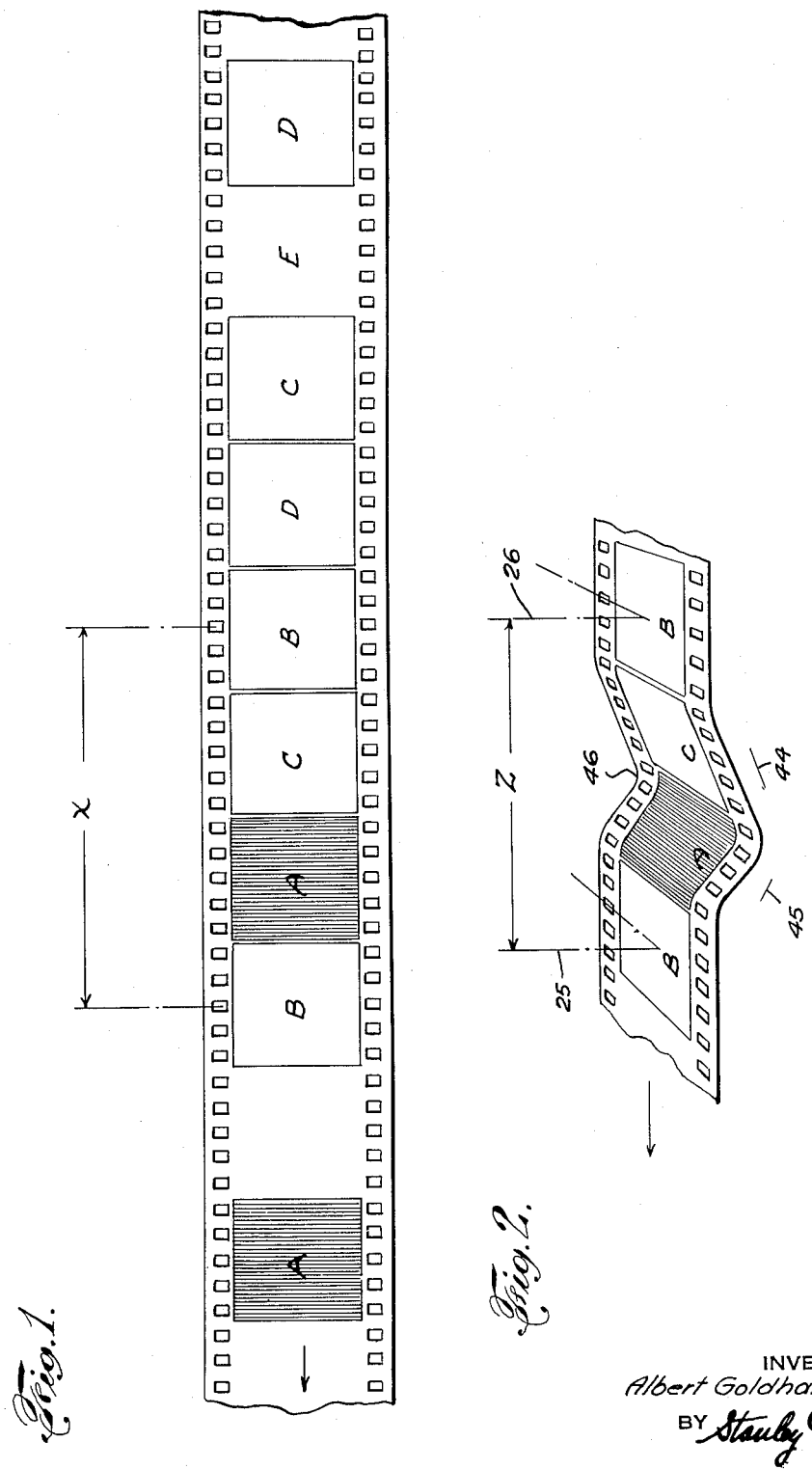
INVENTOR
Albert Goldhammer
BY Stanley Wilder
ATTORNEY Jan. 17, 1956  A. GOLDHAMMER  2,730,938
STEREOSCOPIC CAMERA Filed Feb. 18, 1953  2 Sheets-Sheet 2

INVENTOR
Albert Goldhammer
BY Stanley Wolder
ATTORNEY

United States Patent Office 2,730,938
Patented Jan. 17, 1956

2,730,938

STEREOSCOPIC CAMERA

Albert Goldhammer, Munich, Germany

Application February 18, 1953, Serial No. 337,617

Claims priority, application Germany July 25, 1952

5 Claims. (Cl. 95—18)

The present invention relates to cameras for making stereoscopic exposures and more particularly to those employing continuous film.

Stereoscopic exposures are currently frequently made on double perforated 35 mm. film. Present practice and the proposed American standards call for a five perforation format, e. g. the exposure frame is five perforations wide. Since a pair of frames are exposed simultaneously it is necessary, in order to fully utilize the film that there be two frames between each stereo pair. As recognized by the said standards such separation requires that there be a distance between frame centers of fifteen perforations or approximately 71.25 mm. Current stereo cameras provide a linear film path between exposure openings and hence locate the taking lenses approximately 71 mm. apart Since this is a distance greater than the normal interpupillary distance (62.5 mm. for adults) a well known disturbing over-stereoscopic effect is produced on viewing the exposures. In addition, such cameras are unduly wide.

An effort to solve this problem, made some time back (Fagolle, Film Spacing in Stereoscopic Apparatus, U. S. Patent 2,006,914, July 2, 1935) resulted in an unwieldy, complex unit which left much to be desired.

An object of the present invention is to provide a camera for taking stereoscopic exposures in which the arrangement of parts is such as to enable a compact unit capable of operation without giving rise to hyperstereoscopic effects.

A further object thereof is the provision of a camera which minimizes degradation of picture quality and particularly picture sharpness due to non-linearity of the film during exposure.

A still further object is the provision of such a camera of increased efficiency and of easy yet simple construction.

These and other objects may be achieved by the subject invention which in the preferred form includes a camera body of greater width than length having five cavities opening to the rear; the two lateral peripheral cavities being storage chambers for film, a film magazine might be located in one and a film take-up spool in the other; the two intermediate cavities adjacent to said chambers extending through the body to provide exposure passages, the lenses and shutter systems being located proximate the front of each and each terminating rearwardly in a picture opening; the center cavity being a well into which film traveling between picture openings is bent by means of a projection mounted on a cover for the rear of the camera. Said projection may be eccentrically positionable in said well in the direction of film travel so that the unexposed frame of film in the well may have a substantially linear resting position.

Other objects and a fuller understanding of the present invention may be had by referring to the following expanded description and claims, taken in conjunction with the accompanying drawing which illustrates a preferred embodiment thereof, it being understood that the foregoing statement of the objects of the subject invention and the brief summary thereof are intended to generally explain the same without limiting it in any manner.

Fig. 1 is a plan view of a section of double perforate 35 mm. film, stereo pairs being indicated by identical letters.

Fig. 2 is a perspective view of a portion of such film illustrating the relative bending of adjacent frames while in the center well of the camera.

Figure 3:
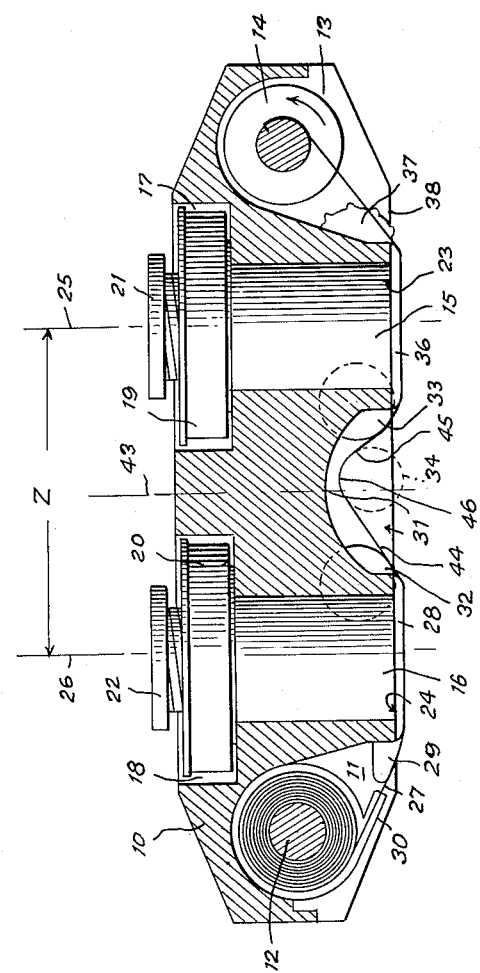
Fig. 3 is a plan view in section of a camera (less the back cover) embodying the subject invention.

Referring to the drawing, the form illustrated includes a camera body 10, there being formed therein at one lateral extremity a cartridge storage chamber 11 adapted to house a conventional film magazine 12, and at the other lateral extremity a spool storage chamber 13, adapted to house a conventional take-up spool 14. A pair of laterally spaced exposure passages 15 and 16 extend from front to rear, each having transverse enlarged shutter chambers 17 and 18 proximate their front portions to house shutter assemblies 19 and 20 to which are mounted forwardly lens assemblies 21 and 22. The exposure passages terminate rearwardly in picture openings 23 and 24 which act as exposure frames. The longitudinal axis of said passages (indicated as broken lines 25 and 26), which coincide with the optical axes of the lenses (not shown) are spaced apart the distance Z, preferably equal to the adult interpupillary distance.

Film 27, such as that shown in Fig. 1, e. g. continuous, double perforate, 35 mm., is fed from magazine 12 across a glide track 28 which in part straddles picture opening 24, first passing over an extension 29 which protrudes into chamber 11 to a point approaching exit flanges 30 of magazine 12. Glide track 28 and its extension 29 possess smooth surfaces over which the emulsion side of film 27 may slide with a minimum of friction.

A recess or well 31, extends from a central portion of the rear body 10 towards the front thereof and is laterally bordered by a pair of rollers 32 and 33. Roller 32 is so located that film traveling off the inner margin of glide track 28 is led smoothly in a new direction over a roller 34 mounted on back cover 35, towards and over roller 33 located at the inner margin of glide track 36. Said track is similar to track 28 and straddles picture opening 24. Hence as film 27 passes roller 33 and glides across track 36 it then follows a path which is substantially coplanar with the path across glide track 28. At the outer margin of glide track 36 is positioned a toothed wheel 37, which is related to the otherwise conventional film transport system to actuate a governor means to limit film travel in a change cycle to two frames. Wheel 37 should preferably have fifteen teeth, corresponding to one transport cycle.

Glide tracks 28 and 36 extend rearwardly of the side wall 38 of body 10 so as to enable ready finishing and polishing in the course of manufacture and to place the film path as far to the rear as possible so that room will be afforded in the front of body 10 to house shutter assemblies 19 and 20 and a portion of lens assemblies 21 and 22.

Figure 4:
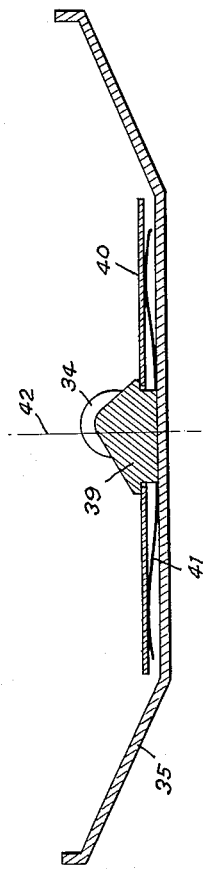
Fig. 4 is a plan view in section of the back cover of said camera.

Cover 35, which is dimensioned to make a light-tight fit over the rear of body 10, bears a pair of spaced lugs 39, in which roller 34 is journalled, and which support as well, and guide without additional connecting means, pressure plates 40 normally urged in a forward direction by spring 41. The lateral center axis of cover 35 is indicated (see Fig. 4) by a dashed line 42. By comparison with said line it may be observed that roller 34 is mounted to one side of said axis, being displaced toward the right in the view shown. Hence, when cover 35 is placed on the rear of the camera, and roller 34 enters well 31, the roller is not bisected by the lateral center axis (indicated by dashed line 43) of body 10 but lies displaced toward picture opening 23, e. g. is displaced in the direction of film travel. The effect of such displacement is to produce an unsymmetrical bend in the path of film 27 as it passes through well 31, said bend being divided into a larger substantially linear portion 44 between rollers 32 and 34 and a shorter arcuate portion 45 between rollers 34 and 33, the full bend 46 across roller 34 being contained in the shorter arcuate portion 45.

Frame spacing on film 27 is illustrated in Fig. 1. Note that when the direction of film travel is right to left and A denotes the first frame pair, then the order is as follows: A—B—A—C—B—D—C—E—D etc. The linear distance X between frame pair centers is fifteen perforations or about 71¼ mm. However, by arranging a non-linear path for the film between picture openings, the linear distance between frame-pair centers may be reduced to a shorter distance, e. g. the interpupillary distance of 62.5 mm. See Fig. 2 which illustrates film lying in the camera, the B pairs being in the picture openings. By reason of the off-center position of roller 34 film in well 31 is bent into the non-symmetrical curvilinear path described above and exposed frame A in the bend is located in the shorter arcuate portion 45 while unexposed frame C, awaiting transportation to picture opening 23, lies along the linear portion 44 of said bend. Hence, if after an exposure, the camera remains unused for a long period, frame C remaining in its present position will not be pressed into a curved form but will remain in a substantially linear portion of the film path. It is self-evident that when even an extremely slight bend remains in the film a good sharp picture cannot result. Roller 34 is preferably at least equal in diameter to the diameter of the roller in magazine 12 so as to prevent a sharper bending in the film path than in the storage means and hence to minimize the possibility of damage to the film.

Obviously, the amount of projection of roller 34 into well 31 will depend upon the distance by which it is desired to separate the optical axes of the lenses and hence the longitudinal axes of exposure passages 15 and 16. The greater the separation desired, the less the penetration of said well.

While I have described the deviating means as roller 34, such means to cause the film path to be curvilinear, need not be a roller but may be merely a highly polished projection over which film 27 may slide. Similarly for rollers 32 and 33, there may be substituted curved stationary glide surfaces.

Extension 29 of glide track 28 is placed so close to exit flanges 30 of magazine 12 in order to minimize the possibility of the folding and hence jamming of the film as it comes from the magazine.

The loading of film is simple. Cover 35 is removed. After magazine 12 is inserted and keyed into chamber 11, the leader of film 27 is successively drawn across picture opening 24, well 31, picture opening 23, and toothed wheel 37; it is then inserted in the slit in take-up spool 14 and tautly taken up. When cover 35 is screwed in place, roller 34 displaces the portion of film 27 lying over well 31 into said well, as above described, and the camera is then set for conventional use.

Although the subject invention has been described with a certain degree of particularity, it is understood that the present disclosure has been made only by way of example and that numerous additions and changes in the details of construction, combination and arrangement may be resorted to without transcending the scope of the invention as hereinafter claimed.

What is claimed is:

1. A stereoscopic camera comprising a body having a pair of laterally spaced exposure passages therethrough, the rear margins of said passages defining picture openings, said body having a well formed between said passages, means for drawing a continuous film across said openings, guide means eccentrically positionable in said well in the direction of film travel to bend said film between said openings into said well into an asymmetric path having a substantially linear branch and an arcuate branch.

2. A camera for taking stereoscopic exposures on a continuous roll of film comprising a transversely elongated camera body having formed therein a pair of spaced exposure passages extending from the front of said body toward the rear and each terminating rearwardly in a picture opening, a film storage chamber outwardly adjacent one of said passages, a film take-up chamber outwardly adjacent the other of said passages, and a well extending inwardly from the rear of said body between said passages, means to store film in each of said chambers, means to draw film in a path from said storage chamber across said picture openings in a predetermined sequence and into said take-up chamber, guide means positionable in said well to cause said path to be bent between said picture openings, said guide means being eccentrically positionable therein in the direction of film travel to cause said bent film path in said well to be asymmetric, having a substantially linear branch and an arcuate branch.

3. A camera as described in claim 2, a cover adapted to close the rear of said camera, said guide means being mounted on the inside of said cover, and being inserted in said well as said cover is closed.

4. A camera as described in claim 2, said film in said bent path including at least a first unexposed frame and a second exposed frame, said first frame lying in said linear branch and said second frame lying in said arcuate branch.

5. A camera as described in claim 2, and guide means along at least portions of said path, projecting rearwardly from the remainder of said wall, a part of said guide means extending into said film storage chamber.

References Cited in the file of this patent

UNITED STATES PATENTS

| | | |
|---|---|---|
| 2,006,914 | Fayolle | July 2, 1935 |
| 2,385,804 | Fitz | Oct. 2, 1945 |
| 2,601,817 | Samoggia | July 1, 1952 |